US008145680B2

(12) United States Patent  
Lippert et al.

(10) Patent No.: US 8,145,680 B2  
(45) Date of Patent: Mar. 27, 2012

(54) SYSTEM AND METHOD FOR USING AN EDITABLE LIFECYCLE EVENT DISTRIBUTION LIST WITH A SERVICE METADATA REPOSITORY

(75) Inventors: Catherine Betz Lippert, Solon, OH (US); Casey Edward Stella, Shaker Heights, OH (US); Philip Daniel Reed, Jr., Cleveland, OH (US); Dennis A. Burns, Lakewood, OH (US)

(73) Assignee: Oracle International Corporation, Redwood Shores, CA (US)

( * ) Notice: Subject to any disclaimer, the term of this patent is extended or adjusted under 35 U.S.C. 154(b) by 270 days.

(21) Appl. No.: 12/364,373

(22) Filed: Feb. 2, 2009

(65) Prior Publication Data

US 2010/0057769 A1     Mar. 4, 2010

Related U.S. Application Data

(60) Provisional application No. 61/093,211, filed on Aug. 29, 2008.

(51) Int. Cl.  
G06F 7/00      (2006.01)  
G06F 17/30     (2006.01)

(52) U.S. Cl. .................. 707/803; 707/695; 707/702

(58) Field of Classification Search .......... 707/695, 707/802, E17.005, 702, 803  
See application file for complete search history.

(56) References Cited

U.S. PATENT DOCUMENTS

| | | | |
|---|---|---|---|
| 6,088,717 A * | 7/2000 | Reed et al. | 709/201 |
| 6,615,241 B1 * | 9/2003 | Miller et al. | 709/206 |
| 7,130,885 B2 * | 10/2006 | Chandra et al. | 709/206 |
| 7,904,468 B2 * | 3/2011 | Neil et al. | 707/763 |
| 7,908,247 B2 * | 3/2011 | Ngo et al. | 707/638 |
| 2003/0088824 A1 * | 5/2003 | Ayan | 715/500 |
| 2003/0093482 A1 * | 5/2003 | Watanabe et al. | 709/206 |
| 2004/0219936 A1 * | 11/2004 | Kontiainen | 455/466 |
| 2005/0083915 A1 * | 4/2005 | Mathew et al. | 370/352 |
| 2006/0075036 A1 * | 4/2006 | Malik | 709/206 |
| 2007/0189503 A1 * | 8/2007 | Pearson et al. | 379/355.04 |
| 2007/0250566 A1 * | 10/2007 | Appelman et al. | 709/204 |
| 2008/0046433 A1 * | 2/2008 | Kool-Brown et al. | 707/9 |
| 2008/0162510 A1 * | 7/2008 | Baio et al. | 707/100 |
| 2008/0178073 A1 * | 7/2008 | Gao et al. | 715/243 |
| 2009/0070291 A1 * | 3/2009 | Tadayon et al. | 707/2 |
| 2009/0216800 A1 * | 8/2009 | Neil et al. | 707/103 Y |
| 2009/0327429 A1 * | 12/2009 | Hughes et al. | 709/206 |
| 2010/0023389 A1 * | 1/2010 | Strasser | 705/14.13 |

* cited by examiner

Primary Examiner — Wilson Lee  
Assistant Examiner — Jessica N Le  
(74) Attorney, Agent, or Firm — Fliesler Meyer LLP

(57) ABSTRACT

A system and method for creating an editable service metadata asset lifecycle event notification distribution list in a service metadata repository. The system provides the capability for a distribution list owner to create a distribution list of one or more distribution recipients. A sender can send a service metadata asset lifecycle event notification to the distribution list owner, and the members of the distribution list will also receive the service metadata asset lifecycle event notification. The system further provides the capability for the sender to edit the distribution list, prior to sending the message to the distribution list owner and the members of the distribution list.

14 Claims, 7 Drawing Sheets

Email Template: All Asset Tabs Approved

Name: All Asset Tabs Approved
Description: Notifies the registrar and the users assigned to the asset that all tabs have been approved.
Status: Active
Subject: All<%asset.name%>tabs have been approved — 602
Mail From: <%updatedby.email%> — 604
Message: All tabs for the asset <%asset.name%> have been approved.|

(Max 4000 Characters)

Valid Substitutions:
- <%asset.name%> - The display name of the used asset
- <%registrar.email%> - The registrar's email address
- <%updatedby.email%> - Person updating the asset
- <%updatedby.name%> - The name of the person updating the asset
- <%asset.tab%> - The name of the asset tab being updated

606

[Save] [Cancel]

SYSTEM AND METHOD FOR USING AN EDITABLE LIFECYCLE EVENT DISTRIBUTION LIST WITH A SERVICE METADATA REPOSITORY

CLAIM OF PRIORITY

The present application claims the benefit of priority under 35 U.S.C. §119(e) to U.S. Provisional Patent Application No. 61/093,211 entitled "SYSTEM AND METHOD FOR USING AN EDITABLE LIFECYCLE EVENT DISTRIBUTION LIST WITH A SERVICE METADATA REPOSITORY," filed on Aug. 29, 2008, which application is incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The invention is related to Service-Oriented Architecture in general, and particularly to an editable service metadata asset lifecycle event distribution list in a service metadata repository.

BACKGROUND

Service-Oriented Architecture (SOA) is based on the deconstruction of yesterday's monolithic applications and information technology infrastructure into a matrix of discrete, standards-based, network-accessible services. The process of transformation requires the organization, identification, and repurposing of applications and business processes of the existing information technology infrastructure. The transformation to SOA begins with an analysis of the IT infrastructure to identify applications, business processes, and other software assets that become services, or otherwise support the SOA.

A Service-Oriented Architecture implements the delivery of software services to clients over a network. SOA differentiates itself from other systems by these features: system resources are made available as loosely-coupled, independent services; services are made available through platform-independent and programming language-independent interfaces that are defined in a standardized way; and services are available both to clients and other services.

SUMMARY

Described herein are embodiments that include systems and methods for creating an editable service metadata asset lifecycle event notification distribution list in a service metadata repository. The system provides the capability for a distribution list owner to create a distribution list of one or more distribution recipients. A sender can send a service metadata asset lifecycle event notification to the distribution list owner, and the members of the distribution list will also receive the service metadata asset lifecycle event notification. The system further provides the capability for the sender to edit the distribution list, prior to sending the message to the distribution list owner and the members of the distribution list.

BRIEF DESCRIPTION OF THE DRAWINGS

Preferred embodiments of the present invention will be described in detail based on the following figures, wherein:

FIG. 6 shows a template for an all assets approved service metadata asset lifecycle event notification, in accordance with an embodiment.

DETAILED DESCRIPTION

Figure 1:
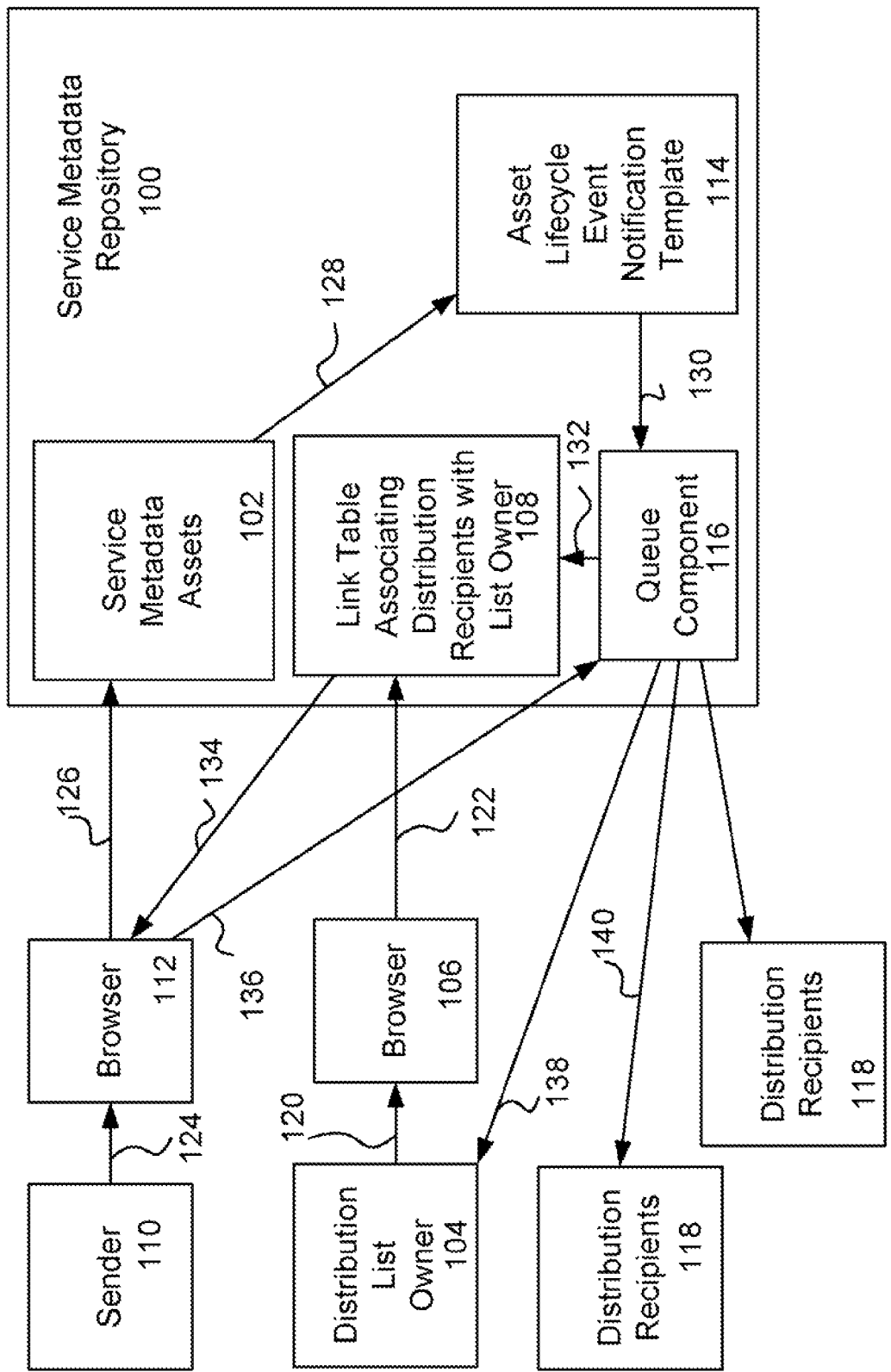
FIG. 1 shows the architecture for a system for creating an editable service metadata asset lifecycle event notification distribution list, in accordance with an embodiment.

Service-Oriented Architecture (SOA) is a new approach to information technology that connects people, process, and technology in a dynamic, distributed environment. Although SOA provides the agility required to innovate and compete in today's economy, it also increases system complexity. To mitigate this risk, organizations control and track information technology investments to ensure alignment with corporate objectives. A service metadata repository enables SOA governance that provides comprehensive insight into the business impact of SOA. A service metadata repository can enable SOA governance to span the SOA lifecycle and unite resources from across divisions and geographies in a collaborative holistic approach to corporate decision-making and compliance by providing the automated exchange of metadata and service information among service consumers, providers, policy decision points, and other governance tools.

In accordance with an embodiment, a service metadata repository provides role-based visibility into all SOA assets, regardless of source, through a centralized repository for SOA assets, such as business processes, services, applications, components, models, frameworks, policies, and data services. Visibility into assets under development minimizes redundancy and promotes service collaboration and reuse. A service metadata repository could also graphically display and navigate asset-to-asset and asset-to-project relationships and interdependencies to simplify impact analysis and ensure business alignment by enabling users to organize and link SOA assets to associated business processes.

Metadata is data about data, or more specifically, information about the content of the data; service metadata is information about the services in an SOA. Service producers use service metadata to describe what service consumers need to know to interact with the service, service producers, and service providers. Service metadata is stored in a metadata repository by service producers and then accessed by service consumers. In accordance with an embodiment, a service metadata repository provides visibility into the portfolio of assets, the traceability of the assets within that portfolio, the relationships and interdependencies that connect the assets to each other, the policies that govern use of the assets, and the projects that produce the assets and consume the assets.

Service metadata is data or other information that is produced by a service producer and used by a service consumer. Service producers and service consumers access the service metadata which can be provided in the form of files on a file system or stored in a database. Service artifacts include data service (.ds) files; XML Schema files; or Web Service Description Language ("WSDL") files. The service metadata provides useful information about a service. Examples include a name, version, last modified timestamp, URL, or other properties. An asset is a representation of service metadata, or a part of service metadata in the service metadata repository. Service metadata assets can be stored in a service metadata repository. The data service files, XML Schema files, and WSDL files themselves can be stored in the repository but are assumed to be stored external to the repository, for example in a source configuration management (SCM) system.

It is not sufficient to simply store design time service metadata assets in a service metadata repository in order to allow reuse of service metadata assets and to promote SOA governance. There are additional problems with service metadata reuse. Determining whether the service assets have a sufficient quality is one problem. A further problem is how to ensure that the right people and the right business processes receive or have access to the right service metadata assets and whether the service metadata assets have been approved by the proper authorities.

Previously, service metadata repositories relied upon the skill of human users (administrators or registrars) to review the asset for quality and to determine that the right people see the right assets. The human user reviewed the asset manually, assigned the asset to a domain expert for review of the content, and after approval by a domain expert, the asset was moved to registered status. Users could then access the registered asset. In some cases, half a dozen different domain experts might be involved in the approval decisions at different stages. For example, an architect might need to approve a WSDL asset before a subsequent approval by a documentation expert. This potentially results in a large number of manual steps in the review and approval process for service metadata assets that must be performed by the administrator or registrar.

What is needed is a way to automatically ensure that the appropriate people and business processes are notified when a relevant service metadata lifecycle event is generated. One approach to this problem is to permit potential recipients of service metadata asset lifecycle event notifications to create their own notification distribution list so that when a distribution list owner is notified of a service metadata lifecycle event, the members of the distribution list are also notified of the service metadata lifecycle event. Although the notification distribution list is created by the distribution list owner, the sender can edit the distribution list for a specific notification prior to sending a notification to remove specific distribution list members, to avoid exposure of sensitive information and/or materials.

An embodiment of a system for creating an editable service metadata asset lifecycle event notification distribution list is shown in FIG. 1. A service metadata repository 100 contains service metadata assets 102. Examples of service metadata repository 100 include Oracle® Enterprise Repository or AquaLogic® Enterprise Repository.

A distribution list owner 104, using 120 a browser 106, creates a list of distribution recipients which is stored 122 in a table 108 associating the distribution recipients with the distribution list owner. In accordance with one embodiment, the table is a link table in a database; other alternatives are contemplated. In one embodiment, the distribution list owner is assigned to a service metadata asset as a submitter, approver, or reviewer of the service metadata asset. The distribution list owner may also be a user who submitted the service metadata asset, the system registrar, an administrator, or any other user who is registered with the asset.

The browser 106 and/or the browser 112 can be a web browser, a client-side application, a thin client application executing inside of a browser, a browser on a mobile device, a dynamically generated web page downloaded from a server into a browser, and other alternatives are contemplated. In accordance with one embodiment, the browser interacts with the metadata service repository through a plug-in on the browser and an application programming interface (API) on the metadata service repository.

A sender 110, using 124 a browser 112, generates an event 126 associated with a service metadata asset 102, such as by making a change to the service metadata asset 102. In one embodiment, the sender has approved, reviewed, made a change, or generated another event associated with the service metadata asset. The sender may also be an approver, a reviewer, the system registrar, an administrator, or any other user who is registered with the asset. An event such as a change to the service metadata asset 102 causes 128 an asset lifecycle event notification template 114 to automatically generate an electronic message to be sent 130 to queue component 116 for delivery to recipients who are associated with the service metadata asset 102. The asset lifecycle event could be generated automatically, or as the result of a discretionary action by the sender. In one embodiment, the sender generates an electronic message to be sent to queue component 116 for delivery to recipients who are associated with the service metadata asset 102. The queue component 116 then adds 132 the distribution recipients associated with the distribution list owner in the link table 108 as additional recipients of the event notification.

In accordance with one embodiment, the service metadata repository 100 then prompts 134 the sender 110 to edit the list of distribution recipients 108, providing the opportunity for the sender to remove distribution recipients from the event notification.

The queue component can be specialized for certain protocols for sending event notifications such as SMTP or can be generalized for sending different types of event notifications. In one embodiment, the queue component 116 is part of the service metadata repository. In alternative embodiments, the queue component 116 is a plug-in to an email server, email client, an integrated development environment, or browser 112. Other alternatives are contemplated.

In an alternative embodiment, a client-side application such as browser 112, an email client, or another application prompts 134 the sender to edit the list of distribution recipients 108, providing the opportunity for the sender to remove distribution recipients from the event notification.

As further shown in FIG. 1, the sender 110 sends 136 the edited list of distribution recipients back to the queue component 116. The queue component 116 then sends 138 the service metadata asset lifecycle event notification to the distribution list owner 104 and sends 140 the service metadata asset lifecycle event notification to the edited list of distribution recipients 118. In an embodiment for which the queue component 116 is a plug-in to an email client, the sender 110 uses the queue component 116 to send the service metadata asset lifecycle event notification via email to the distribution list owner 104 and the edited list of distribution recipients 118.

Figure 2:
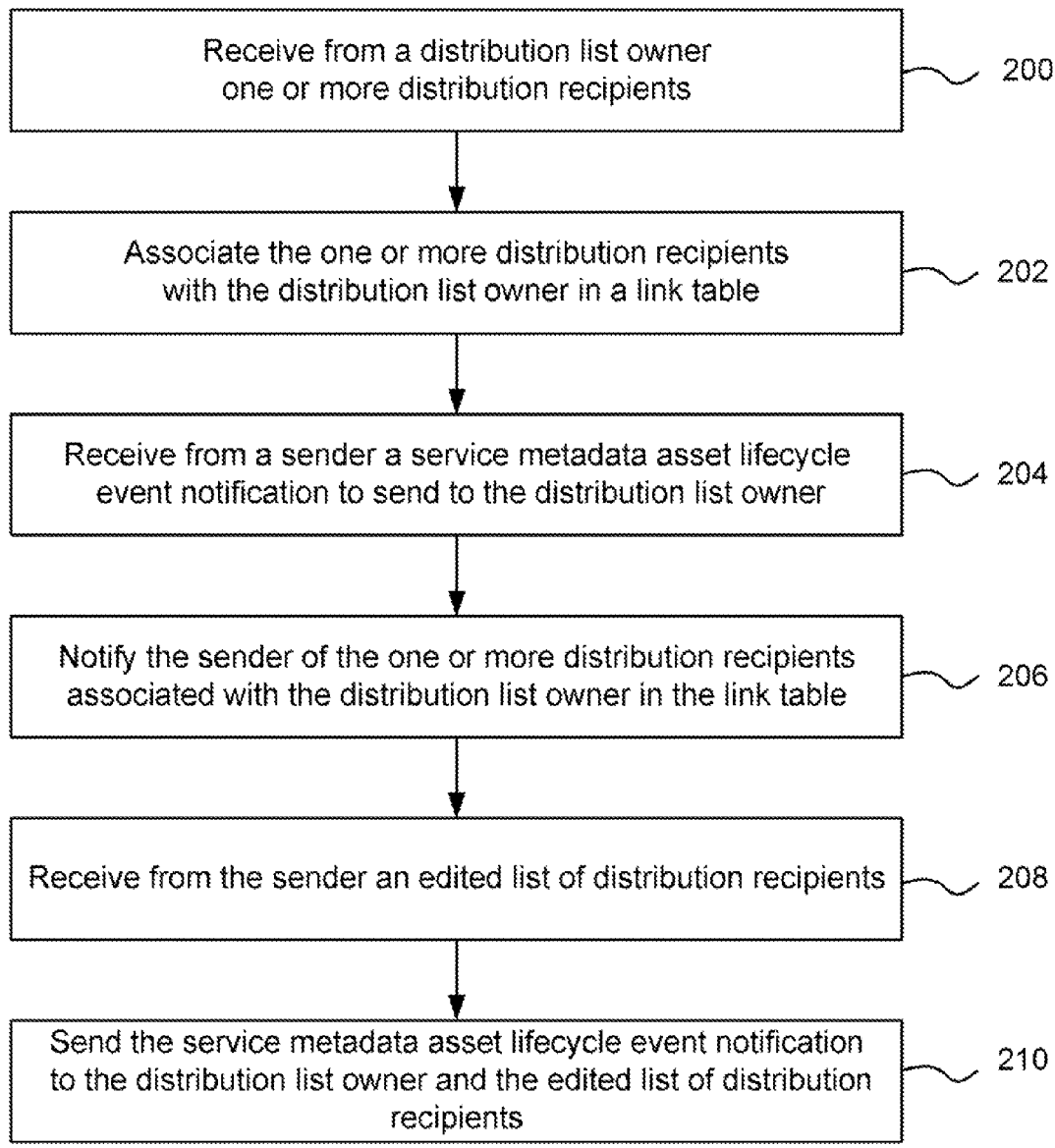
FIG. 2 shows a flowchart for a method for creating an editable service metadata asset lifecycle event notification distribution list, in accordance with an embodiment.

FIG. 2 shows a flowchart for creating an editable service metadata asset lifecycle event notification distribution list in a service metadata repository, in accordance with an embodiment. As shown in FIG. 1, in step 200, one or more distribution recipients are received from a distribution list owner. In step 202, the one or more distribution recipients are associated with the distribution list owner in a link table. In step 204, a service metadata asset lifecycle event notification is received from a sender to send to the distribution list owner. In step 206, the sender is presented with the one or more selected distribution recipients associated with the distribution list owner in the link table. In step 208, an edited list of distribution recipients is received from the sender. In step 210, the service metadata asset lifecycle event notification is sent to the distribution list owner and the edited list of distribution recipients.

Although described as a series of steps, other alternatives are contemplated, and the steps do not need to be executed in the order described above. Furthermore, the system and methods described above can take place as a single process and/or a single system, or in a distributed environment involving many different processes and/or many different systems. In some embodiments, email or other messaging systems are used for the event notifications.

Figure 3:
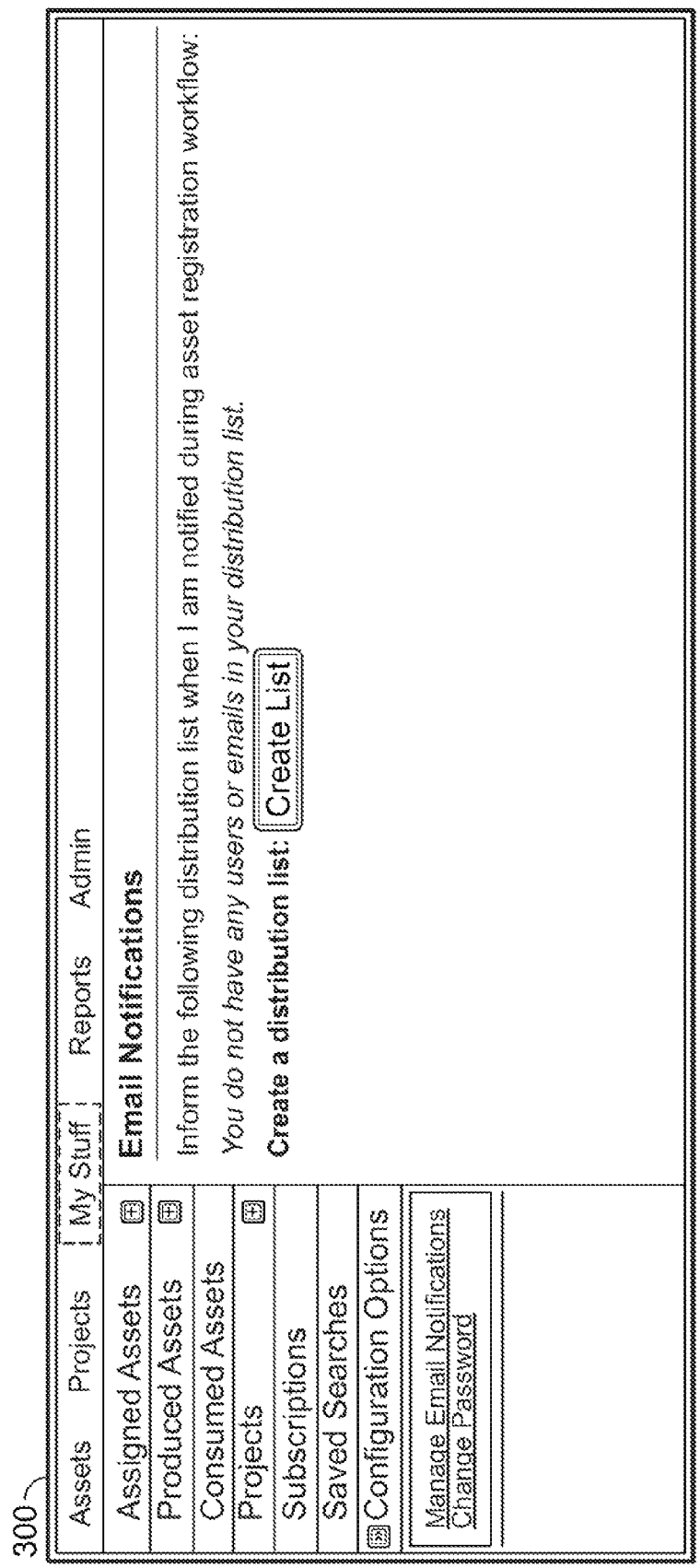
FIG. 3 shows a browser displaying a personalized home page with links to service metadata assets and a link to a service metadata asset event notification distribution list, in accordance with an embodiment.

FIG. 3 shows a browser displaying a personalized home page with links to service metadata assets and a link to a service metadata asset event notification distribution list. As shown in FIG. 3, in accordance with one embodiment, each user is provided with a personalized home page referred to herein as a "My Stuff" page, which in turn comprises several clickable elements. In one embodiment, a distribution list feature is one of the options that are linked to each user's My Stuff page. In some embodiments, the distribution list may also be referred to as a notification list, a cc list, "Email Notifications," or other alternatives. Clicking on the Email Notifications link brings up or generates a distribution list page or screen similar to that shown in FIG. 4.

Figure 4:
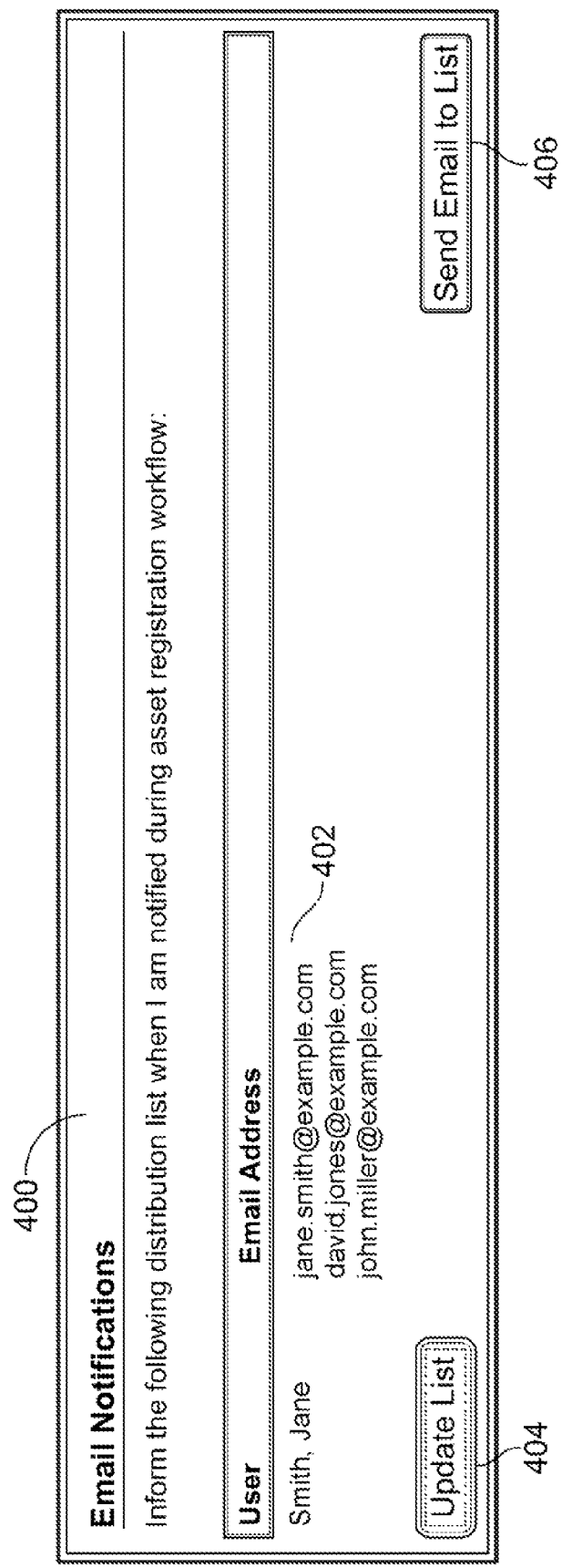
FIG. 4 shows a browser displaying a service metadata asset lifecycle event distribution list, in accordance with an embodiment.

FIG. 4 shows a browser displaying a service metadata asset lifecycle event distribution list, in this embodiment referred to as an "Email Notifications" page 400. The distribution list provides a list of users and email addresses 402 on the distribution list, in addition to links that allow the user to update the list 404 and send a notification to the list 406. Clicking on the link to update the list brings up or generates an "Update Distribution List" page or screen similar to that shown in FIG. 5.

Figure 5:
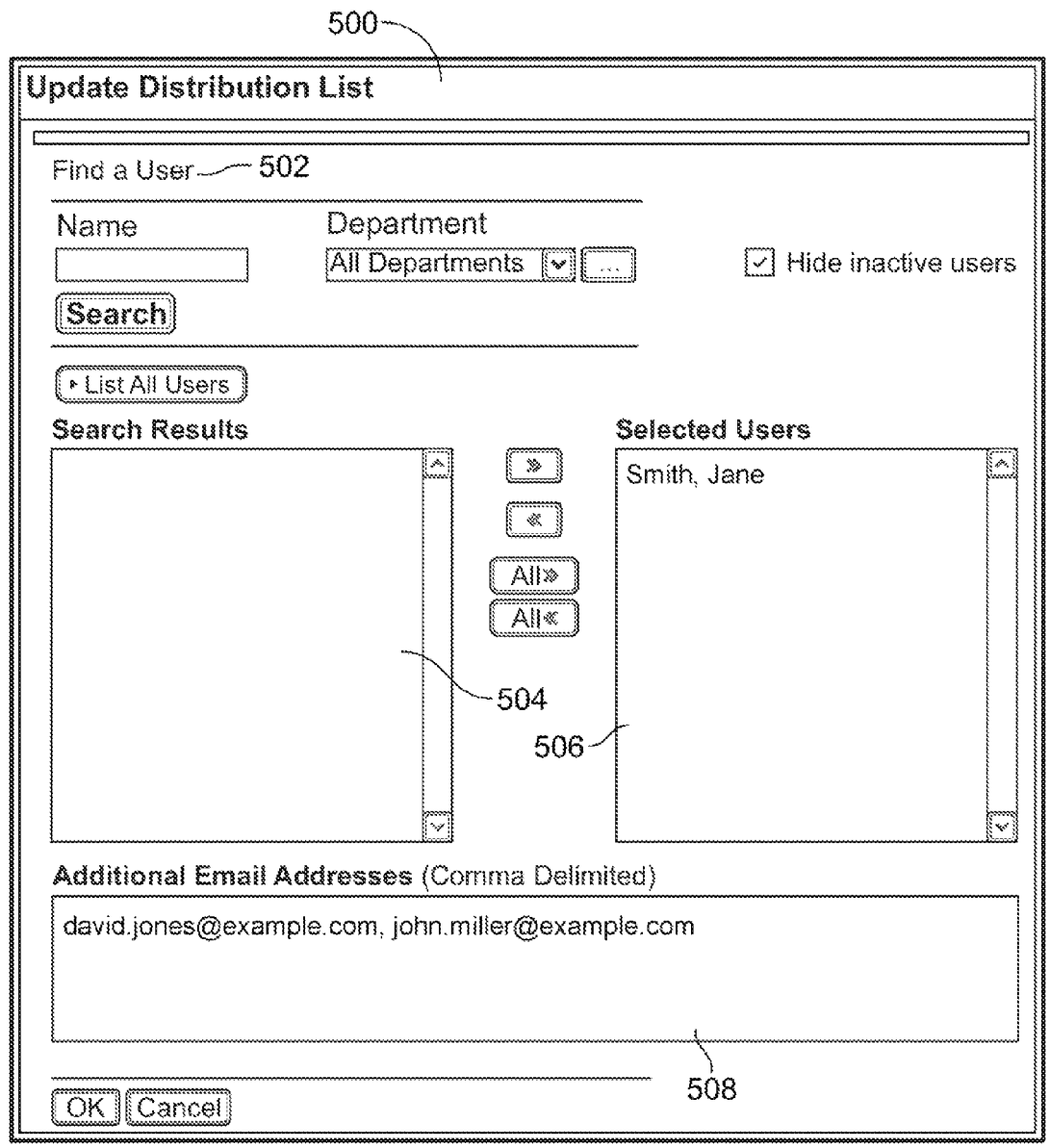
FIG. 5 shows a browser permitting searching for and selecting users to add to a service metadata asset lifecycle event distribution list, in accordance with an embodiment.

FIG. 5 shows a browser displaying an update distribution list window 500 that permits searching for 502, and selecting users 504, to add to a service metadata asset lifecycle event distribution list 506. The update distribution list 500 also permits adding email addresses 508 to the distribution list. To find specific users of the service metadata repository, the user can enter appropriate text in the name text box 502, using the department drop-down to narrow the search and click the search button. To list all service metadata repository users, the user can click the list all users button. The user can also add users to the distribution list by using the >> and << buttons to move users from the search results column 504 to the selected users column 506. To add or remove all users from either column, the user can use the all >> and all << buttons. To add users to the list who are either not in the service metadata repository or their user identity is unknown, the user can type the email addresses in the additional email addresses box 508, using commas as delimiters.

FIG. 6 shows a template for an all assets approved service metadata asset lifecycle event notification. Certain events within the service metadata repository trigger automated email responses. For instance, when a new asset is submitted, a service metadata asset lifecycle event notification is sent to the registrar. FIG. 6 shows an example for an email template 600 to send an automated email to the registrar and users assigned to the asset that all tabs have been approved 602. An administrator, system registrar, sender, or other user can configure the template. The sender 604 of the automated email is then automatically filled in as the user who was logged in and approved the final tab. Furthermore, the automated email will be sent to any users on the distribution lists for the registrar and the users who are assigned to the asset. The email template relies upon several substitutions 606 that are dynamically generated by the service metadata repository at run time.

In accordance with one embodiment, asset event notifications may include both discretionary event notifications and automated event notifications. Discretionary event notifications vary depending on circumstance and can be customized by the sender. Automated event notifications are processed by the workflow without involving customization.

In accordance with one embodiment, alternative events that can generate automated notifications include Asset Accepted, Asset Active, Asset Deletion, Asset Inactive, Asset Registered, Asset Retired, Asset Unaccepted, Asset Unregistered, Asset Unsubmitted, Asset Used, Asset Submission Rejection, Asset Editor submission, Asset Assigned, Asset Tab Approved, Asset Tab Unapproved, Asset Unassigned, Compliance Template Applied, New Asset Version under development, New Version Registered, Repository submission, Usage Reassigned, and other alternatives are contemplated. Different notifications can be sent to different users depending upon the specific event.

In an alternative embodiment, the distribution list can include email addresses that are not associated with a user. In one alternative, the service metadata repository only supports the system registrar as a distribution list owner if the system registrar is a user. Another alternative embodiment enables the system registrar to own a distribution list without being a user.

In accordance with an embodiment, the sender of a service metadata lifecycle event notification is prompted with the opportunity to edit the recipient's service metadata lifecycle event notification distribution list in order to remove specific distribution list members to avoid exposure of sensitive information and/or materials. Examples of specific distribution list members to remove include (a) employees who do not have access to a specific project, (b) members of other companies, and/or (c) foreign nationals.

In an embodiment that uses object-oriented programming, classes can be used to save and load the distribution lists. In a specific embodiment, an SMTP Queue component in the service metadata repository provides the distribution list to the sender.

Service metadata asset distribution lists can be created so that list members are automatically copied on certain notifications that are generated as part of the asset registration process. Service metadata asset distribution lists can help automate the asset registration workflow as members of the distribution list are notified about asset registration events that the list owner is involved in as an asset reviewer or approver. For example, if a list owner is expecting to be absent, the list owner can delegate asset review and approval responsibility by adding other authorized users to their email distribution list.

An advantage of this system is the ability for a user to specify a distribution list of email addresses and users which will be copied on any workflow interaction that the user is involved in. This provides the ability for users to manage their distribution lists and for workflow email notifications to abide by and use the distribution lists in sending email.

In one embodiment, service metadata asset distribution lists are created on a user's MyStuff page using the My Email Notifications page, as described above. Existing users can be selected for a distribution list. In one embodiment, external email addresses can also be selected for a distribution list. In one embodiment, an administrator can configure and control the types of recipients that can be placed on a distribution list, for example, disallowing email addresses that are not associated with users.

In some embodiments, the distribution list can be automatically populated by a lifecycle event notification message, and the sender is provided the discretion to remove distribution recipients. In one embodiment, the sender removes distribution recipients one-by-one on a message-by-message basis. In an alternative contemplated embodiment, the sender can create customized rules to modify a distribution list, thereby not requiring the sender to remove distribution recipients one-by-one on a message basis (i.e., rules for a particular sender would not send certain event notifications outside a company, etc.).

In some embodiments, the distribution list owner creates a list of recipients, including users, email addresses, and other distribution lists.

In one embodiment, the event notification message includes a link to the service metadata asset. Users on an event notification distribution list still only have their normal security access to the service metadata repository, so the distribution recipient may not have access to the service metadata asset, or even to view the service metadata asset in the service metadata repository.

In one embodiment, the distribution list owner uses an asset editor feature to click on icons, such as approved by, registered by, submitted by, etc., which generate an email to approvers and reviewers registered with an asset and to the distribution lists associated with the registered approvers and reviewers.

In one embodiment, a system includes a service metadata repository, a table, one or more service metadata assets stored in the service metadata repository, and an email client. The service metadata repository receives from a distribution list owner one or more distribution recipients. The table associates the one or more distribution recipients with the distribution list owner. The service metadata repository receives from a sender a service metadata asset lifecycle event notification to send to the distribution list owner. The email client presents the sender with the one or more selected distribution recipients associated with the distribution list owner in the table, wherein the email client receives an edited list of distribution recipients; and wherein the email client sends the metadata asset lifecycle event notification to the distribution owner and the edited list of distribution recipients.

An example use case is described below:
1. A first user logs into the application (acting as a distribution list owner).
2. The first user creates a new distribution list in a My Stuff page.
3. The first user adds users and additional emails to the distribution list.
4. A second user logs into the asset editor (acting as a sender) and loads an asset associated with the first user.
5. The second user clicks on the envelopes on an administration tab and ensures that the distribution list for the asset reflects the first user's distribution list in the notification. In one embodiment, distribution list recipients who do not have access to view this asset will not have their email show up in the notification even though they are listed on the first user's distribution list.
6. The second user edits the distribution list to remove distribution recipients who should not receive the notification.
7. The notification is sent to the first user and the edited list of distribution recipients.

An alternative use case is described below:
1. Users are added to a system registrar's distribution list.
2. Users are added to a first user's distribution list.
3. A first user submits an asset via a quick submit feature, and a registrar submits an asset via an asset editor.
4. Users in the system registrar's distribution list receive notification messages for the "Asset Editor Submission" event and users in the first user's distribution list receive notification messages for the "Repository Submission" event.
5. The registrar accepts the quick submitted asset from the first user. Notification messages for the "Asset Accepted" event are sent to all users in the first user's distribution list.
6. The registrar assigns the asset to a second user and a third user. Notification messages for the "Asset Assign" event are received by all users in the distribution lists for the second and third users.
7. The second and third users approve all of their assigned tabs. Notification messages for the "Asset Tab Approved" event are sent to the registrar and all users in the registrar's distribution list. Notification messages for the "All Asset Tabs Approved" event are sent to all users in the registrar's distribution list (in addition to previously-assigned user's distribution lists).
8. The second and third users unapprove each of their assigned tabs. Notification messages for the "Asset Tab Unapproved" event are sent to all users in the registrar's distribution list. Notification messages for the "Asset Tab Unapproved" event are sent to all users in the User 1's distribution list.
9. Registrar registers the quick submitted asset. Notification messages for the "Registration" event are sent to the recipient and all users in the recipient's distribution list.

Figure 7:
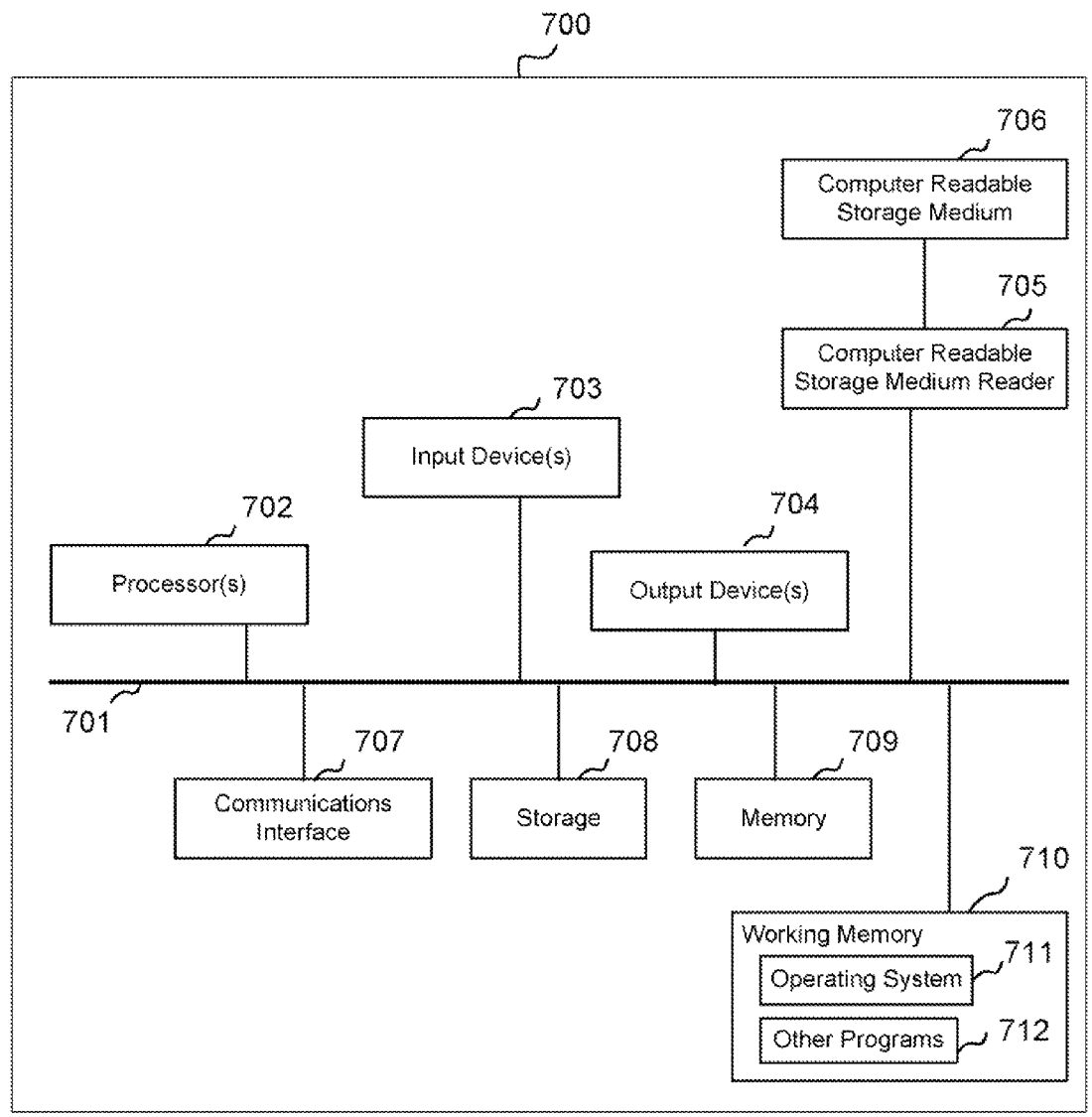
FIG. 7 is a hardware block diagram of an example computer system, which may be used to embody one or more components, in accordance with one embodiment.

FIG. 7 illustrates an exemplary processing system 700, which can comprise one or more of the elements of FIG. 1. While other alternatives might be utilized, it can be presumed that the components of the systems of FIG. 1 are implemented in hardware, software or some combination by one or more computing systems consistent therewith, unless otherwise indicated.

Computing system 700 comprises components coupled via one or more communication channels (e.g., bus 701) including one or more general or special purpose processors 702, such as a Pentium®, Centrino®, Power PC®, digital signal processor ("DSP"), and so on. System 700 components also include one or more input devices 703 (such as a mouse, keyboard, microphone, pen, and so on), and one or more output devices 704, such as a suitable display, speakers, actuators, and so on, in accordance with a particular application. (It can be appreciated that input or output devices can also similarly include more specialized devices or hardware/software device enhancements suitable for use by the mentally or physically challenged.)

System 700 also includes a computer readable storage media reader 705 coupled to a computer readable storage medium 706, such as a storage/memory device or hard or removable storage/memory media; such devices or media are further indicated separately as storage 708 and memory 709, which may include hard disk variants, floppy/compact disk variants, digital versatile disk ("DVD") variants, smart cards, read-only memory, random access memory, cache memory, and so on, in accordance with the requirements of a particular application. One or more suitable communication interfaces 707 may also be included, such as a modem, DSL, infrared, RF or other suitable transceiver, and so on for providing inter-device communication directly or via one or more suitable private or public networks or other components that may include but are not limited to those already discussed.

Working memory 710 further includes operating system ("OS") 711 elements and other programs 712, such as one or more of application programs, mobile code, data, and so on for implementing system 700 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 712 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory (e.g., storage device 708 or memory 709), in accordance with a particular application. Embodiments can include computer-based methods and systems which may be implemented using a conventional general purpose computer(s) or a specialized digital computer(s) or microprocessor(s) or virtual machine(s), programmed according to the teachings of the present disclosure. Appropriate software coding can readily be prepared by programmers based on the teachings of the present disclosure.

Embodiments can include a computer readable medium, such as a computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling the hardware of a computer, such as a general purpose/specialized computer(s) or microprocessor(s), and for enabling them to interact with a human user or other mechanism utilizing the results of the present invention. Such software may include, but is not limited to, device drivers, operating systems, virtual machines, virtual operating systems, execution environments/containers, and user applications.

Embodiments can include providing code for implementing processes. The providing can include providing code to a user in any manner. For example, the providing can include providing the code on a physical media to a user; or any other method of making the code available.

Embodiments can include a computer-implemented method for transmitting the code which can be executed at a computer or a virtual machine to perform any of the processes of embodiments. The transmitting can include transfer through any portion of a network, such as the Internet; through wires; or any other type of transmission. The transmitting can include initiating a transmission of code; or causing the code to pass into any region or country from another region or country. A transmission to a user can include any transmission received by the user in any region or country, regardless of the location from which the transmission is sent.

The foregoing description of embodiments has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method for creating an editable service metadata asset lifecycle event notification distribution list, said method comprising:

providing a service metadata repository on a computing device, said service metadata repository storing a set of service metadata assets associated with a plurality of applications distributed on a network, wherein each service metadata asset is associated with an owner, and wherein each service metadata asset includes data for accessing a service provided by at least one of said applications;

receiving from said owner associated with a particular service metadata asset, an indication of one or more distribution recipients that are designated to receive notifications regarding the particular service metadata asset stored in the service metadata repository;

associating the one or more distribution recipients with the owner in a link table, wherein the owner and the one or more distribution recipients are related to the particular service metadata asset through the link table;

triggering, by a sender, an event associated with the particular service metadata asset, said event causing an asset lifecycle event notification template to automatically generate a service metadata asset lifecycle event notification in the service metadata repository;

detecting the service metadata asset lifecycle event notification generated in the service metadata repository, wherein the service metadata asset lifecycle event notification is an electronic message that contains a link to the particular service metadata asset, wherein the service metadata asset lifecycle event notification is communicated to a queue component for delivery to the one or more distribution recipients, and wherein the queue component adds the one or more distribution recipients stored in the link table;

presenting the sender with the one or more distribution recipients associated with the owner in the link table;

receiving from the sender an edited list of distribution recipients that includes one or more modifications to the distribution recipients in the link table; and sending the service metadata asset lifecycle event notification, from the queue component, to the owner and to the edited list of distribution recipients.

2. The method of claim 1, wherein a change, submission, or review of the service metadata asset generates a service metadata asset lifecycle event in the service metadata repository.

3. The method of claim 1, wherein the owner reviews the service metadata asset in the service metadata repository.

4. The method of claim 1, wherein a queue component notifies the sender of the one or more distribution recipients associated with the owner in the link table.

5. The method of claim 1, wherein a queue component sends the service metadata asset lifecycle event notification to the edited list of distribution recipients.

6. The method of claim 1, wherein the owner interacts with the metadata repository through a browser.

7. The method of claim 1, wherein the event associated with the service metadata asset is a change to the service metadata asset.

8. A non-transitory computer readable storage medium, including instructions stored thereon for creating an editable service metadata asset lifecycle event notification distribution list, said instructions, when read and executed by a computer cause the computer to perform steps comprising:

providing a service metadata repository on a computing device, said service metadata repository storing a set of service metadata assets associated with a plurality of applications distributed on a network, wherein each service metadata asset is associated with an owner, and wherein each service metadata asset includes data for accessing a service provided by at least one of said applications;

receiving from said owner associated with a particular service metadata asset, an indication of one or more distribution recipients that are designated to receive notifications regarding the particular service metadata asset stored in the service metadata repository;

associating the one or more distribution recipients with the owner in a link table, wherein the owner and the one or more distribution recipients are related to the particular service metadata asset through the link table;

triggering, by a sender, an event associated with the particular service metadata asset, said event causing an asset lifecycle event notification template to automatically generate a service metadata asset lifecycle event notification in the service metadata repository;

detecting the service metadata asset lifecycle event notification generated in the service metadata repository, wherein the service metadata asset lifecycle event notification is an electronic message that contains a link to the particular service metadata asset, wherein the service metadata asset lifecycle event notification is communicated to a queue component for delivery to the one or more distribution recipients, and wherein the queue component adds the one or more distribution recipients stored in the link table;

presenting the sender with the one or more distribution recipients associated with the owner in the link table;

receiving from the sender an edited list of distribution recipients that includes one or more modifications to the distribution recipients in the link table; and sending the service metadata asset lifecycle event notification, from the queue component, to the owner and to the edited list of distribution recipients.

9. The non-transitory computer readable storage medium of claim 8, wherein a change, submission, or review of the service metadata asset generates a service metadata asset lifecycle event in the service metadata repository.

10. The non-transitory computer readable storage medium of claim 8, wherein the owner reviews the service metadata asset.

11. The non-transitory computer readable storage medium of claim 8, wherein a queue component presents the sender with the one or more distribution recipients associated with the owner in the link table.

12. The non-transitory computer readable storage medium of claim 8, wherein a queue component sends the metadata asset lifecycle event notification to the edited list of distribution recipients.

13. The non-transitory computer readable storage medium of claim 8, wherein the owner interacts with the service metadata repository through a browser.

14. A system for creating an editable service metadata asset lifecycle event notification distribution list comprising a physical memory storing a set of instructions and one or more hardware processors that execute said instructions to perform steps comprising:

providing a service metadata repository on a computing device, said service metadata repository storing a set of service metadata assets associated with a plurality of applications distributed on a network, wherein each service metadata asset is associated with an owner, and wherein each service metadata asset includes data for accessing a service provided by at least one of said applications;

receiving from said owner associated with a particular service metadata asset, an indication of one or more distribution recipients that are designated to receive notifications regarding the particular service metadata asset stored in the service metadata repository;

associating the one or more distribution recipients with the owner in a link table, wherein the owner and the one or more distribution recipients are related to the particular service metadata asset through the link table;

triggering, by a sender, an event associated with the particular service metadata asset, said event causing an asset lifecycle event notification template to automatically generate a service metadata asset lifecycle event notification in the service metadata repository;

detecting the service metadata asset lifecycle event notification generated in the service metadata repository, wherein the service metadata asset lifecycle event notification is an electronic message that contains a link to the particular service metadata asset, wherein the service metadata asset lifecycle event notification is communicated to a queue component for delivery to the one or more distribution recipients, and wherein the queue component adds the one or more distribution recipients stored in the link table;

presenting the sender with the one or more distribution recipients associated with the owner in the link table;

receiving from the sender an edited list of distribution recipients that includes one or more modifications to the distribution recipients in the link table; and sending the service metadata asset lifecycle event notification, from the queue component, to the owner and to the edited list of distribution recipients.

* * * * *

UNITED STATES PATENT AND TRADEMARK OFFICE
CERTIFICATE OF CORRECTION

| | | |
|---|---|---|
| PATENT NO. | : 8,145,680 B2 | Page 1 of 1 |
| APPLICATION NO. | : 12/364373 | |
| DATED | : March 27, 2012 | |
| INVENTOR(S) | : Lippert et al. | |

It is certified that error appears in the above-identified patent and that said Letters Patent is hereby corrected as shown below:

In column 11, line 27, in Claim 6, delete "metadata" and insert -- service metadata --, therefor.

In column 12, line 25, in Claim 12, delete "metadata" and insert -- service metadata --, therefor.

Signed and Sealed this
Seventeenth Day of July, 2012

David J. Kappos
*Director of the United States Patent and Trademark Office*